United States Patent [19]

Hopwood et al.

[11] Patent Number: 4,586,044
[45] Date of Patent: Apr. 29, 1986

[54] CLUTTER POSITIONING FOR ELECTRONICALLY AGILE MULTI-BEAM RADARS

[75] Inventors: Francis W. Hopwood, Severna Park; John W. Gipprich, Catonsville, both of Md.

[73] Assignee: Westinghouse Electric Corp., Pittsburgh, Pa.

[21] Appl. No.: 460,688

[22] Filed: Jan. 24, 1983

[51] Int. Cl.[4] .............................................. G01S 13/52
[52] U.S. Cl. .................................. 343/7.7; 343/7 A; 343/17.1 R
[58] Field of Search ................. 343/5 SA, 7 A, 50 P, 343/7.7, 17.1 R, 368, 371, 16 R

[56] References Cited

U.S. PATENT DOCUMENTS

| | | | |
|---|---|---|---|
| 3,735,400 | 5/1973 | Sletten et al. | 343/17.1 R X |
| 3,858,206 | 12/1974 | Scheidler et al. | 343/7 A |
| 4,040,054 | 8/1977 | Overman | 343/7 A |
| 4,220,954 | 9/1980 | Marchand | 343/378 X |
| 4,249,179 | 2/1981 | Kolachy | 343/7.7 X |
| 4,290,066 | 9/1981 | Butler | 343/17.1 R |

Primary Examiner—Nelson Moskowitz
Assistant Examiner—Mark Hellner
Attorney, Agent, or Firm—W. E. Zitelli

[57] ABSTRACT

An electronically agile multi-beam radar including a clutter positioning system for positioning the band of clutter signals in the derived doppler frequency spectrum of each of the individual beams is disclosed. The radar is operative to switchedly transmit a plurality of beams directionally separated by time sharing the illuminating power thereof. Each beam includes at least one transmission of a plurality of R.F. pulses constituting a radar look. The radar is also operative to receive echo R.F. pulses of the look from each transmitted beam dispersed in time with echo R.F. pulses of the looks of the other transmitted beams of the plurality. The clutter positioning system operates to maintain substantially a desired pulse-to-pulse phase relationship for the received plurality of echo pulses of each look of each beam in a time-shared manner in order to derive a substantially representative pulse doppler spectrum of signals associated with each look of the transmitted beams and to adaptively position an identified group of clutter signals about a prespecified dopper frequency in a derived doppler frequency spectrum for each look of each beam. The clutter positioning system may be disposed in either the transmission portion or the reception portion of the radar in which case it effects substantially the desired pulse-to-pulse phase relationship at each transmitted or received R.F. pulsed beam, respectively.

3 Claims, 8 Drawing Figures

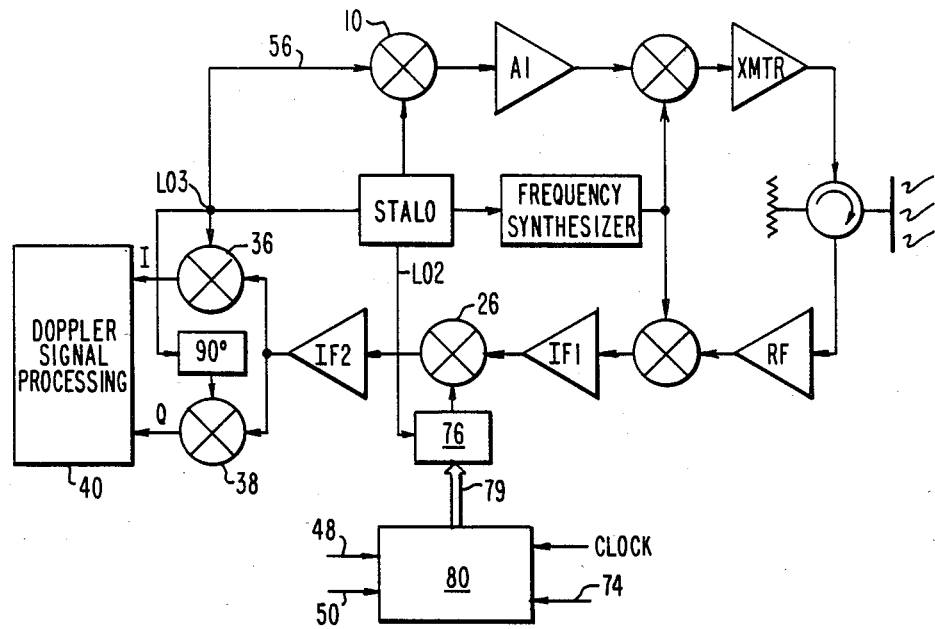
FIG. 6
FIG. 7
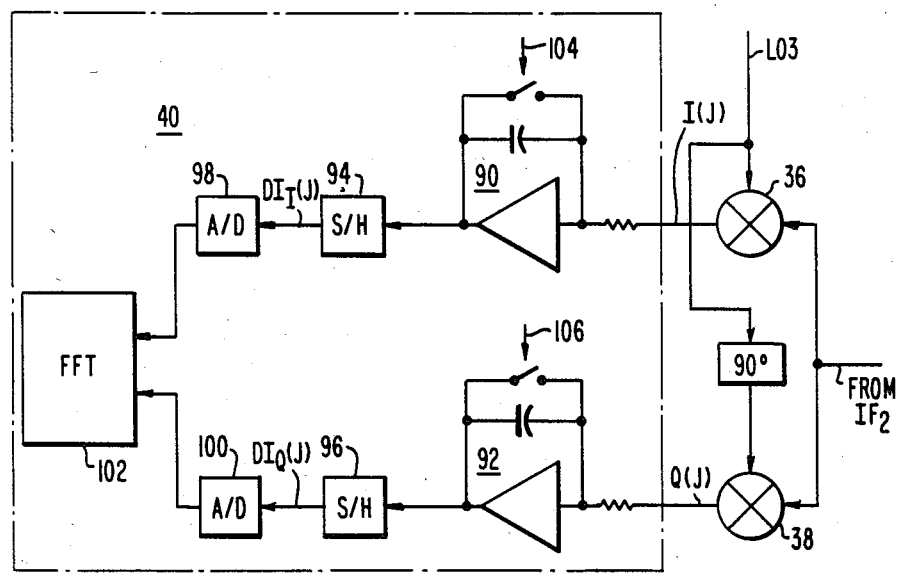

CLUTTER POSITIONING FOR ELECTRONICALLY AGILE MULTI-BEAM RADARS

BACKGROUND OF THE INVENTION

The present invention relates to electronically agile multi-beam radars in general, and more particularly to clutter positioning apparatus for disposition therein to adaptively position an identified group of clutter signals about a prespecified doppler frequency in the doppler frequency spectrum for each of the beams of the radar.

A typical radar of the pulse doppler-coherent type is depicted in the block diagram schematic of FIG. 1. In the exemplary radar of FIG. 1, the transmission portion includes the conventional units of a mixer/filter circuit 10, an amplifier A1, another mixer/filter circuit 12 and a transmitter unit 14, all cascadedly coupled together to effect a pulsed R.F. signal over signal line 16 coupled to one input of a conventional microwave circulator 18. An antenna system shown at 20 may be coupled to another port of the circulator 18. Still another port of the circulator 18 couples the antenna system 20 to the receiving portion of the exemplary radar which includes an R.F. amplifier, a mixer/filter circuit 24, a first IF amplifier IF1, another mixer/filter circuit 26 and a second IF amplifier IF2, all cascadedly coupled together. A stable local oscillator (STALO) 28 may provide a fixed IF signal denoted as LO2 to both of the mixer/filter circuits 10 and 26. An R.F. signal may be generated by the STALO 28 and provided to a frequency synthesizer 30 over signal line 32. The synthesizer 30 may alter the generated R.F. signal so as to provide a desired sequence of R.F. frequency signals, denoted as LO1, to the mixer/filter units 12 and 24.

Downstream of the IF2 amplifier may be a pair of a conventional mixer/filter circuits 36 and 38 for effecting the in phase (I) and quadrature (Q) signal components from the receiver signals. The STALO 28 may generate a fixed frequency signal denoted as LO3 which is supplied in phase to the mixer/filter circuit 36 and 90 degrees out-of-phase to the mixer/filter circuit 38. The I and Q components of the receiver signals may be supplied to a conventional doppler signal processing section 40 which derives a substantially representative doppler frequency spectrum of signals therefrom.

Generally within the doppler frequency spectrum of signals there may be an identified group of clutter signals, commonly referred to as the main beam clutter, which may be positioned about an undesirable doppler frequency or within an undesirable range of doppler frequencies. Under these conditions, any moving targets having a doppler frequency characteristic within the clutter range would be masked by the clutter signals. In addition, as a result of practical unbalance of hardware components, such as an unbalance between the mixer/filter circuits 36 and 38, for example, which effect the I and Q signal components of the received signals, an image of the main beam clutter may be produced in the doppler spectrum mirrored about the baseband doppler frequency which in the present case is zero doppler frequency. An illustration of these clutter signal bands both main beam and image, is shown in the exemplary graph of FIG. 2A. As has been explained above, any moving targets having doppler frequencies within the ranges of the clutter signals could be masked and pass undetected by the radar.

Present radars are using clutter positioning techniques to tune the main beam clutter to the doppler baseband frequency and remove it from the moving target detection ranges in the doppler frequency spectrum. For example, in an airborne radar employing downlook air-to-air modes, the doppler frequencies of the main beam clutter are a function of primarily the velocity of the aircraft and the angle position of the antenna radar beam with respect to the earth. Thus, with these two factors being either known or measurable, a compensating frequency signal may be injected into the radar at a prespecified location to tune the main beam clutter signals to a new, more desirable, position in the doppler frequency spectrum, normally about the doppler baseband frequency.

One way of accomplishing this is using a conventional clutter position computer 42, a digital-to-analog (D/A) converter 44 and a voltage controlled crystal oscillator (VCXO) 46 as depicted in the schematic of FIG. 1. For example, a signal 48 representative of the measured aircraft velocity and a signal 50 representative of the angle of the radar beam may be provided to the clutter position computer 42 which may then compute therefrom a control word 52 which may be converted to an analog signal 54 via the D/A converter 44 to govern the output frequency of the VCXO 46. The output frequency signal 56 in the present example is provided to the mixer/filter circuit 10.

For an operational example, let us assume that the VCXO 46 generates a frequency signal 56 with a nominal frequency of 40 megahertz. If the fixed frequency signal LO2 is on the order of 1460 megahertz, then the mixer 10 may effect an IF frequency of on the order of 1500 megahertz which is, in turn, amplified by A1 and provided to mixer 12. Should the frequency LO1 be generated at 7500 megahertz, then the mixer 12 provides an R.F. carrier on the order of 9 gegahertz which is pulsed by the transmitter unit 14 and transmitted to the antenna system 20 via line 16 and circulator 18. Accordingly, an echo signal may be received by the antenna system 20, passed through circulator 18 and provided to the R.F. amplifier. The received signal may be beat down in mixer 24 by the signal LO1, which is set at 7500 megahertz. The first IF signal may be conditioned by the IF1 amplifier and further beat down in mixer 26 to the second IF level by the fixed frequency signal LO2. The second IF signal which is now on the order of 40 megahertz may be conditioned by the amplifier IF2 and conducted to the I-Q mixers 36 and 38. If the STALO 28 generated frequency signal LO3 is set at 40 megahertz also, then any doppler frequency spectrum derived from the received echo signals or components thereof will include a main beam and image groupings of clutter signals as illustratively shown in FIG. 2A.

However, the present system includes the clutter position computer 42 which is provided with the signals 48 and 50 to derive a compensating frequency to reposition the main beam clutter to the baseband level within the doppler frequency spectrum. It does this by deviating the frequency signal 56 of the VCXO 46 from its nominally chosen value, in this case 40 megahertz, as governed by the control word 52 via D/A 44. Of course, as the main beam clutter grouping of signals is positioned to baseband, its mirror image in the doppler frequency spectrum is likewise tuned to the same new position. The graph of FIG. 2B illustratively shows the main beam and image clutter groupings of doppler signals positioned about the doppler baseband frequency (i.e. zero doppler frequency).

More sophistication in clutter positioning may be provided in some radars as the application demands. Techniques such as clutter tracking, for example, are presently employed in some radar systems to stabilize the main beam clutter about baseband. In these more sophisticated radars, a "servoing" or additional governing signal 60 may be supplied to the clutter position computer 42 to alter the control word 52 and eventual frequency signal 56 in a timely manner to stabilize the clutter frequency signal grouping about the doppler baseband frequency in the doppler frequency spectrum.

These types of clutter positioning techniques have been found adequate for conventional radars using slow moving mechanically scanned antennas wherein the signal beam is scanned through a spatial region very slowly. However, the more contemporary radars are designed for electronically agile multibeam operation where the antenna beam is electronically and rapidly switched between a multiplicity of targets, that is the antenna power is time shared through a variety of antenna beam directions. Thus, the main beam clutter doppler frequency groupings will be at various doppler frequencies dependent primarily on the direction of the antenna beam and aircraft velocity.

In the clutter positioning operation, each main beam clutter grouping in the doppler spectrums of the plurality of antenna beams will have to be tuned to the baseband doppler independently. If the clutter positioning is mechanized using the VCXO embodiment for clutter positioning as described in connection with the embodiment of FIG. 1, a clutter positioning circuit comprising the elements 42, 44 and 46 would be needed for each directionally effected antenna beam of the radar. Rapidly tuning a VCXO is not suitable since phase memory must be maintained in a coherent radar.

To better understand the problem of phase memory, let us assume that each beam of the antenna includes at least one transmission of a plurality of R.F. pulses constituting a radar look and that the radar is operative to receive echo R.F. pulses of the look for each transmitted beam interspersed in time with echo R.F. pulses of the looks of the other transmitted beams of the plurality of beams. The interpulse period of the pulse doppler coherent radar may be divided into transmissionable time slots with each time slot corresponding to a potential transmission time for an R.F. pulse of a different beam look. Under these conditions, the radar must keep a fixed phase relationship from pulse-to-pulse in order to derive a substantially representative doppler frequency spectrum of signals associated with each look of the radar beams. Thus, with the requirement of a phase memory another problem is introduced further complicating the clutter positioning operation of a electronically agile multibeam radar.

SUMMARY OF THE INVENTION

An electronically agile multi-beam radar is operative to switchedly transmit a plurality of beams directionally separated by time sharing the illuminating power thereof. Each beam includes at least one transmission of a plurality of R.F. pulses constituting a radar look. The radar is also operative to receive echo R.F. pulses of the look from each transmitted beam interspersed in time with echo R.F. pulses of the look of the other transmitted beams of the plurality.

In accordance with the present invention, the radar comprises a means for maintaining substantially a desired pulse-to-pulse phase relationship for the received plurality of echo pulses of each look of each beam in a time-shared manner in order to derive a substantially representative doppler frequency spectrum of signals associated with each look of the transmitted beams and to adaptively position an identified group of clutter signals about a prespecified doppler frequency in the desired doppler frequency spectrum for each look of each beam. More specifically, the radar may be of a pulse-doppler coherent type having an interpulse period divided into transmissionable time slots wherein each time slot corresponds to a potential transmission time for an R.F. pulse of a different beam look. In this embodiment, the maintenance means includes a means for deriving in a time-shared manner a relative phase characteristic for each of the plurality of R.F. pulse beams in accordance with the direction of transmission thereof, means for storing the derived relative phase characteristics corresponding to the time slot for which they are derived, and means for accessing each stored relative phase characteristic once each interpulse period to effect substantially the desired pulse-to-pulse relationship corresponding to the R.F. pulse beam associated therewith. The deriving means is operative to perform the derivations for all the aforementioned beams, once each transmissional time slot of the interpulse period.

In one embodiment, the maintenance beam includes a phase shifter disposed in the transmission portion of the radar and updated with the accessed relative phase characteristic corresponding to the pulse beam being transmitted once each interpulse period to effect the desired pulse-to-pulse phase relationships thereof. In another embodiment, the maintenance means includes a phase shifter disposed in the reception portion of the radar and updated with the accessed relative phase characteristic corresponding to the R.F. pulse beam being received once each interpulse period to effect the desired pulse-to-pulse phase relationship thereof.

Still further, the radar may be disposed on-board an aircraft which includes a means for measuring the velocity of the aircraft in flight. In this case, the deriving means may include means for deriving in a time-shared manner a relative phase characteristic for each of the plurality of R.F. pulse beams in accordance with both the direction of the corresponding beam transmission and the measured aircraft velocity associated therewith.

BRIEF DESCRIPTION OF THE DRAWINGS

FIG. 6 is still another radar embodiment suitable for utilizing the clutter positioning system as described in connection with FIG. 3.

FIG. 7 is a simplified block diagram schematic of a doppler signal processing unit which is suitable for operation with a radar embodying the clutter positioning system of FIG. 3.

DESCRIPTION OF THE PREFERRED EMBODIMENT

Figure 3:
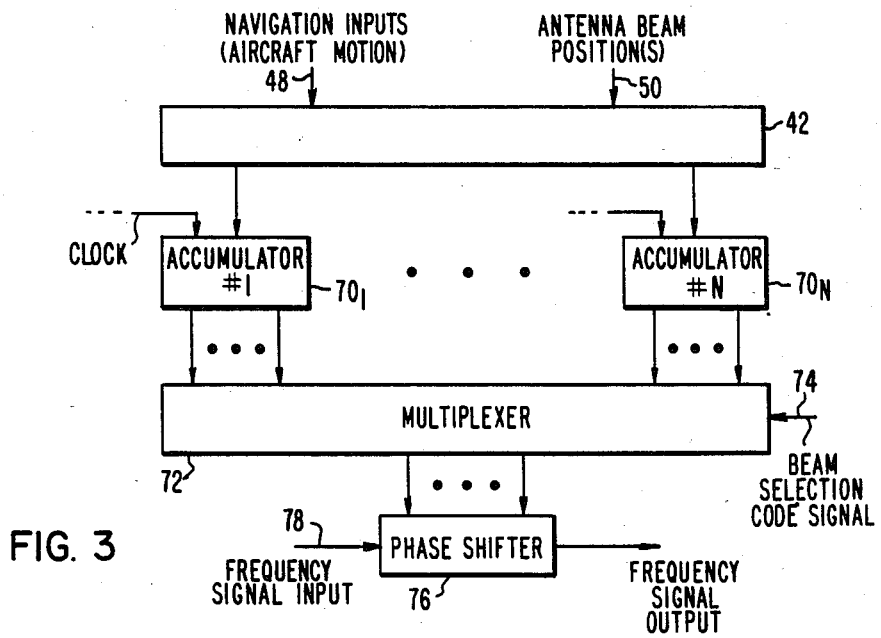
FIG. 3 is a block diagram schematic of an embodiment for clutter positioning suitable for use in an electronically agile multi-beam radar similar to the one depicted in the embodiment of FIG. 1.

An embodiment for clutter positioning suitable for use in an electronically agile multi-beam radar is depicted in the block diagram schematic shown in FIG. 3. The embodiment may be disposed at an appropriate place in the radar for maintaining substantially a desired pulse-to-pulse phase relationship for the received plurality of echo pulses of each look of each beam in a time shared manner in order to derive a substantially representative doppler frequency spectrum of signals associated with each look of the transmitted beams and to adaptively position an identified group of clutter signals about a prespecified doppler frequency in the derived doppler frequency spectrum for each look of each beam. The disposition of the embodiment in the radar system will be described in greater detail hereinbelow.

Figure 1:
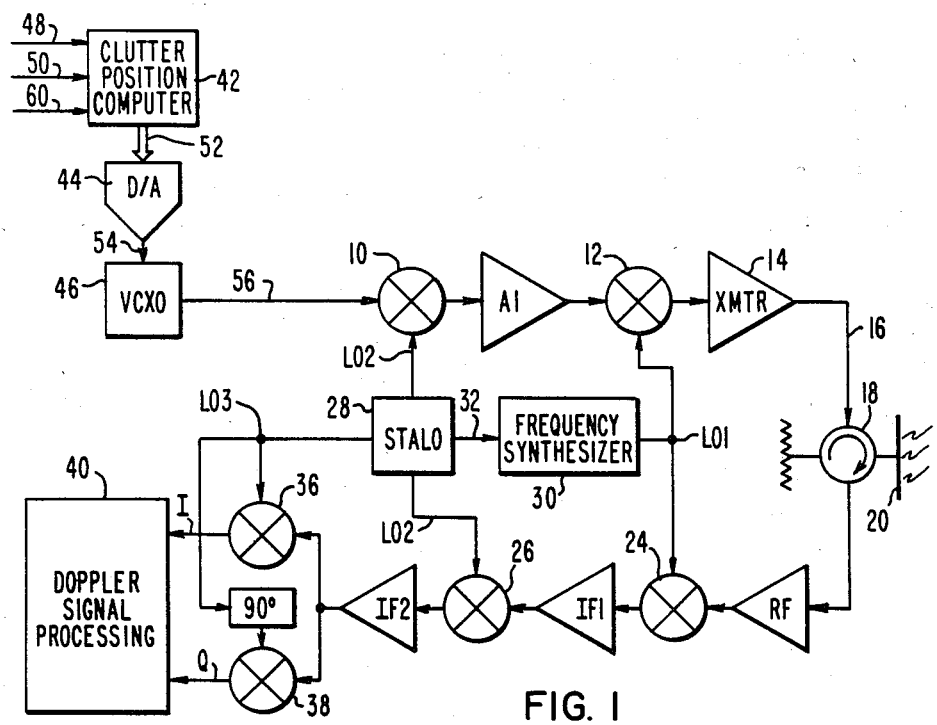
FIG. 1 is a block diagram schematic of an embodiment of a typical radar of the pulse doppler-coherent type.

Included in the embodiment of FIG. 3 may be a clutter position computer 42 for deriving in a time shared manner a relative phase characteristic for each of the plurality of R.F. pulse beams in accordance with the direction of transmission thereof. The computing device 42 may be operative to perform the derivations for all the aforementioned beams once each transmissionable time slot of the interpulse period of the radar. The computing device 42 may be of a conventional variety similar to the type described in connection with the embodiment of FIG. 1 but in the present example used in a time shared manner to compute the control words for each of the beams being switchedly transmitted by the radar. Likewise, the information which may be needed by the computing device 42 in its derivations of the control words may be provided thereto over signal lines 48 and 50 much the same as that described in connection with the embodiment of FIG. 1.

The derived relative phase characteristics may be accumulated and stored in a storage device corresponding to the time slot for which they are derived. In the present embodiment, a plurality of accumulators $70_1$ through $70_N$ are provided having their inputs coupled to the computing device 42, each corresponding to a transmitted radar beam of the radar. The output words of the accumulators $70_1$ through $70_N$ may be coupled to a digital word multiplexer 72 which may be governed by a beam selection code signal 74. The selected digital word output of the multiplexer 72 may be coupled to a device which may be used, when disposed in the radar at an appropriate position, to effect substantially the desired pulse-to-pulse relationship corresponding to the R.F. pulse beam associated therewith.

In the present embodiment, the effecting device 76 may comprise a phase shifter of the digital variety governed by a digital word. The phase shifter may be disposed in a transmission line of the radar to shift the phase of the frequency signal associated therewith. The phase shifter element 76 may be of the type described in the U.S. Pat. No. 4,160,958 issued to James H. Mims et al. on July 10, 1979, and may comprise phase shifting circuit elements similar to the type described in U.S. Pat. No. 4,205,282 issued to John W. Gipprich on May 27, 1980. Both of the aforementioned patents are incorporated by reference herein for providing a more detailed description of the phase shifter element 76 of the preferred embodiment.

Figure 2A:
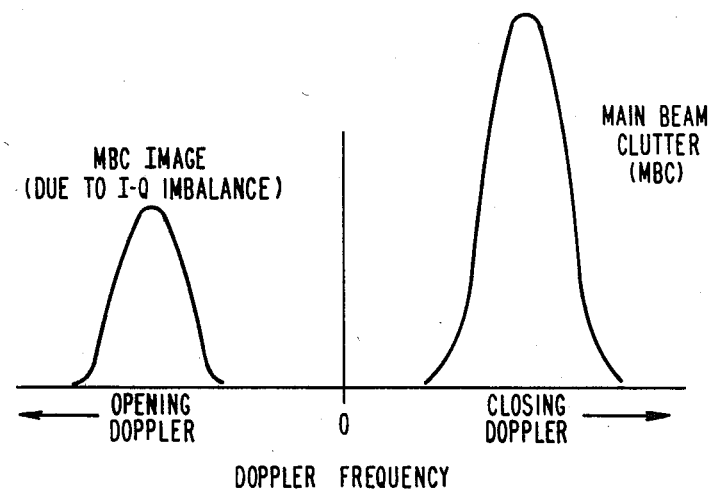
FIGS. 2A and 2B are graphs exemplifying main beam clutter and its image in a derived doppler frequency spectrum and the positioning thereof to a desired doppler frequency within the spectrum.
Figure 2B:
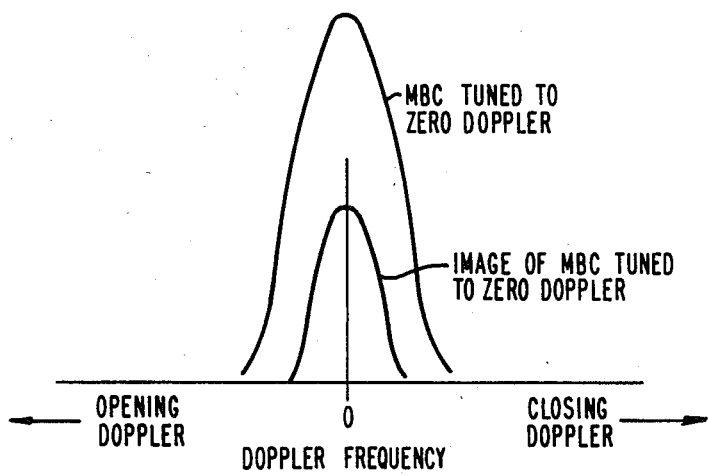

In an exemplary operation, as the antenna of the radar is rapidly switched between beam spatial positions, the appropriate digital accumulator $70_1$ through $70_N$ may be connected to the phase shifting element by the multiplexer 72 as governed by the code signal 74. The clutter position computing element 42 may be operative continuously to derive the control words associated with the plurality of beams in accordance with the supplied navigational information and beam position information over signal lines 48 and 50, respectively. Because the beam transmitted from the radar has a finite beam width, a clutter spread in the derived doppler frequency spectrum for each look of the beam is expected. More specifically, the echo returns for an angle at one portion of the beam will be at a different doppler frequency than that of the echo returns for the angle at a different portion of the beam. As a result of this phenomena, the main beam clutter has a doppler frequency bandwidth as illustrated in the graphs of FIGS. 2A and 2B. Consequently, the computer 42 cannot derive a specific frequency for the main beam clutter associated with the beam. Conventionally, these type derivations which are performed in the computer 42 use the average phase progression of the main beam clutter, which may be considered as the center frequency $f_c$ thereof.

It is understood that the intention of the clutter positioning embodiment as described in connection with FIG. 3 when disposed in an appropriate transmission line of the radar is to impose a phase on each R.F. pulse of a radar beam such that when it is finally received, the main beam clutter association with that beam appears at essentially the baseband or zero doppler frequency in the doppler frequency spectrum derived for the beam, thus causing the main beam clutter and its image to fall into a signal processor filter notch for post-processing operations. It can be shown that only one phase setting per transmission pulse of the radar is needed to effect the pulse-to-pulse phase relationship desired, thus the phase characteristic derivations and phase settings of the phase shifter elements 76 need be done only at clock rates substantially equal to the transmitter pulse width. This will be more fully appreciated by the description provided in subsequent portions of the instant specification.

A typical radar which may utilize the clutter positioning embodiment described in connection with FIG. 3 may have parameters as follows:

Tp=Transmit pulse width (1 range cell, i.e., transmissionable slot).

Tpp=Interpulse period (assumed constant for the present example).

Nr=Number of range cells (Tpp/Tp)

Np=Number of pulses coherently integrated (i.e. a look).

Bf=Doppler filter bandwidth=$1/(Np \cdot Tpp)=1/(Nr \cdot Np \cdot Tp)$.

Fres=$1/(10 \cdot Nr \cdot Np \cdot Tp)$ The clutter position frequency resolution (Fres) is conventionally computed on the order of about 1/10 the doppler filter bandwidth Bf.

Each storage accumulator $70_1$ through $70_N$ of the preferred embodiment may utilize B bits. In this case, the corresponding least significant control word phase bit is defined as $2\pi/2^B$. The control word input to an accumulator may be advanced by W least significant bits each time the accumulator is updated or clocked. The phase associated with the accumulator, thus advances by $2\pi \cdot W/2^B$ with each update or clock pulse.

The frequency generated by the phase shifter 76 may be represented by the following mathematical relationships:

$$F(W) = \frac{1}{2\pi} \cdot \frac{\Delta\phi}{\Delta t} \tag{1}$$

$$F(W) = \frac{1}{2\pi} \cdot \frac{\Delta\phi}{\Delta \text{Clock}} \cdot \frac{\Delta \text{Clock}}{\Delta \text{Time}} \tag{2}$$

$$F(W) = \frac{1}{2\pi} \cdot \left( W \cdot \frac{2\pi}{2^B} \right) \cdot \frac{1}{Tp} \tag{3}$$

$$F(W) = \frac{W}{Tp \cdot 2^B} \tag{4}$$

The resolution frequency Fres may be represented mathematically by the following equation:

$$F_{res} = \frac{1}{Tp \cdot 2^B} \tag{5}$$

$$F_{res} = \frac{1}{10Nr \cdot Np \cdot Tp} \tag{6}$$

Thus, the required number of bits B for the accumulator input words may be derived from the preceding equations and represented mathematically as:

$$2^B = 10Nr \cdot Np. \tag{7}$$

The maximum input control word may correspond to the maximum doppler frequency of interest $F_{DMAX}$ as follows:

$$W_{MAX} = F_{DMAX}/F_{res}. \tag{8}$$

The above equation (8) represents the maximum number of bits per update $W_{MAX}$ in an input control word of an accumulator $70_i$ derived by the computing element 42.

A typical radar of the pulse doppler coherent variety may have the following parameters:
Tp = 1 microsecond pulse width.
Tpp = 100 microsecond (10 KHz PRF).
Nr = Tpp/Tp = 100 range cells or transmissionable slots.
Np = 64 integrated pulses per look.
Thus, $2^B = 10 \cdot 64 = 64,000$, and B = 16 bits (i.e. $2^{16} = 65536$).

$$F_{res} = 1/(Tp \cdot 2^B) = 1/(10^{-6} \cdot 2^{16}) = 15.258 \text{ Hz}.$$

For 62.5 KHz maximum doppler frequency, $$W_{MAX} = 62,500/15.258 = 2^{12} \text{ (i.e. 12 bits)}.$$

Thus, each of the accumulators $70_1$ through $70_N$ may utilize 12 input binary bits and 16 output binary bits. On the other hand, if the output word of the accumulations is truncated to 12 binary bits, it results in spurious of about $-6$ dB/bit $\times$ 12 bits or $-72$ dB, in which case the system provides on the order of 70 dB dynamic range. In other words, the accumulators $70_1$ through $70_N$ should accommodate relative phase change updates at 16 bits for the desired frequency resolution. Of the 16 bits, the 12 most significant bits may be utilized to drive a 12 bit binary phase shifter, like that shown at 76, to provide the desired dynamic range. Typically, an agile beam radar might utilize 10 to 20 beams, each tracking a target. In this case, a like number of accumulators would be included with each being switched to govern the phase shifter 76 via the multiplexer 72 when the appropriate beam is selected as represented by the beam selection code signal 74.

One radar embodiment suitable for utilizing the clutter positioning system as described in connection with FIG. 3 is depicted in the block diagram schematic of FIG. 4. In this embodiment, the phase shifter 76 may be disposed in the transmission portion of the radar and updated with the accessed relative phase characteristic control word 79 corresponding to the R.F. pulse beam being transmitted once each interpulse period to effect the desired pulse-to-pulse phase relationship thereof. The relative phase characteristic control word 79 is derived by the unit 80 which comprises the computing element 42, accumulators $70_1$ through $70_N$ and multiplexer 72 and operates in a similar manner as that described for this combination of elements hereabove. More specifically, the phase shifter 76 is disposed in the transmission line between the first mixer/filter unit 10 and amplifier A1 with the input thereof coupled to the mixer 10 and output coupled to the amplifier A1. In this disposition, the phase shifter 76 may effect substantially the desired pulse-to-pulse phase relationship in each transmitted R.F. pulse beam using the accessed relative phase characteristic control words 79 corresponding associated with the beams once each interpulse period. The nominal frequency signal supplied to the mixer 10 over the signal line 56, for this example, may be generated by the STALO 28 and may be of the same frequency as that used for the I and Q mixers 36 and 38, denoted as LO3.

An alternate radar embodiment utilizing the clutter positioning system described in connection with FIG. 3 is depicted in a block diagram schematic in FIG. 5. In this embodiment, the phase shifter 76 may be disposed in the transmission line carrying the frequency signal LO2 coupled between the STALO 28 and mixer 10. The nominal frequency supplied to the mixer 10. The frequency signal over line 56 may be generated by the STALO 28 and be the same frequency utilized by the mixers 36 and 38, denoted as LO3. The operation may be similar to that described in connection with the embodiment of FIG. 4.

Still another alternate radar embodiment which includes the phase shifter 76 disposed in the reception portion of the radar is shown in a block diagram schematic in FIG. 6. More specifically, the phase shifter is disposed in the transmission line which carries the frequency signal LO2 coupled between the STALO 28 and mixer 26. In operation, the clutter positioning unit comprising elements 76 and 80 effects substantially the desired pulse-to-pulse phase relationship in each received R.F. pulse beam using the accessed relative phase characteristic control words 79 corresponding thereto once each interpulse period.

Another embodiment of a radar may include the aforementioned phase shifter 76 in one of the transmission lines coupling the frequency synthesizer 30 to either mixer 12 or mixer 24. However, because of the frequency variation nature of the frequency signal LO1 conducted through the transmission line of the phase shifter 76 this embodiment is considered to be somewhat more sophisticated than the others described in connection with FIGS. 4 through 6 hereabove. Nonetheless, it is considered a workable embodiment taking into consideration the varying frequencies involved from beam to beam or even in some cases from look to look. It is understood that some further additions and/or modifications may have to be made to the embodiment described in connection with FIG. 3, however, it is felt that these additions and/or modifications will not deviate from the broad principles of the present invention and may be carried out by someone skilled in the pertinent art.

With regard to updating the phase shifter 76 only once each transmitted pulse of a beam independent of the particular embodiment used, the following analysis is provided and supplemented with the circuit schematic of FIG. 7. FIG. 7 represents a simplified schematic of a doppler signal processing unit 40 suitable for operation with a radar embodying the clutter positioning system of FIG. 3. Referring to FIG. 7, conventional dumped integrators 90 and 92, sample and hold circuits 94 and 96, and A/D converters 98 and 100 may be respectively disposed in cascade in their corresponding I and Q transmission paths which are coupled to a fast fourier transform (FET) signal processor 102. The dumped integrators 90 and 92 may be operated conventionally by gating signals 104 and 106, respectively. Ideally, the inputs to the dumped integrators 90 and 92 may be represented mathematically by the following equations for the J'th pulse:

$$I(J) = \cos[\omega_D t + \phi_{cp}(J)] \quad (9)$$

$$Q(J) = \sin[\omega_D t + \phi_{cp}(J)] \quad (10)$$

Where:
$\omega_D$ is the doppler frequency (i.e. center frequency) of the main beam clutter, and
$\phi_{CP}(J)$ is the phase shifter setting for the J'th pulse.

Figure 4:
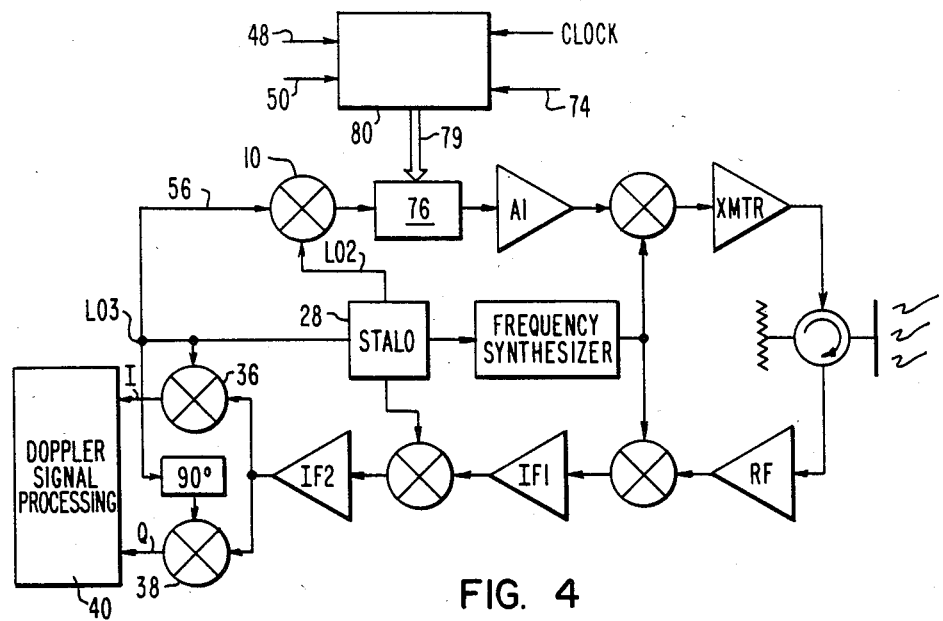
FIG. 4 is a block diagram schematic of a radar embodiment suitable for utilizing the clutter positioning system similar to the type described in connection with FIG. 3.
Figure 5:
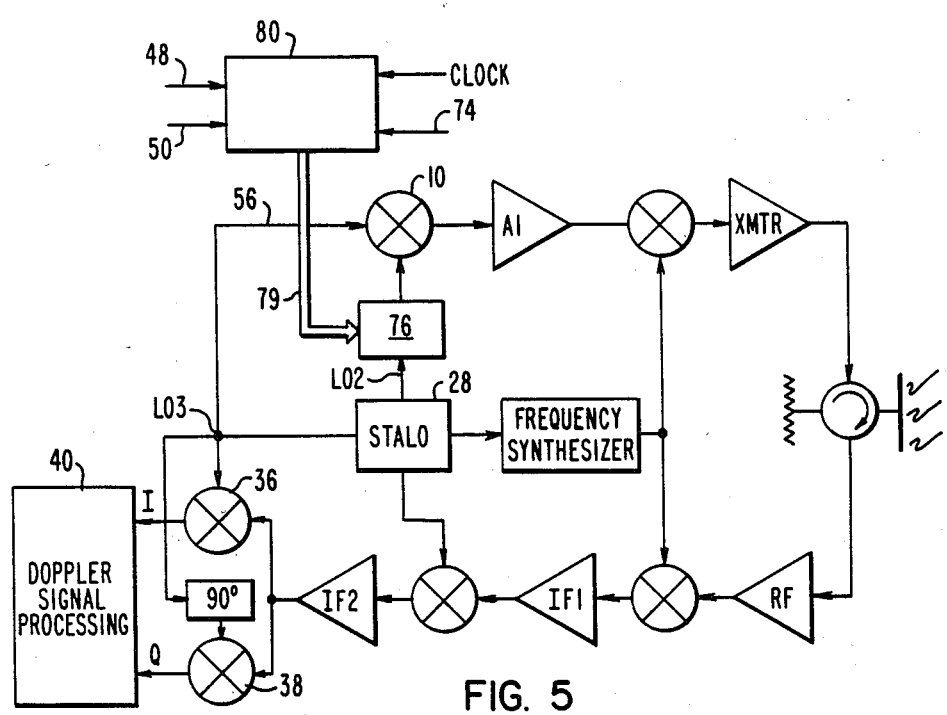
FIG. 5 is another radar embodiment suitable for utilizing the clutter positioning system as described in connection with FIG. 3.

It is understood that in a practical sense, the mixers and amplifiers of the radar such as depicted in FIGS. 4 through 6 introduce amplitude uncertainties which shall be donated as $\epsilon$, and phase shift errors which shall be denoted as $\phi_E$, both of which will be assumed here to be independent of $\omega_D$. Thus, the dumped integrator inputs may then be represented mathematically including the amplitude uncertainty and phase shift error as follows:

$$I(J) = \cos[\omega_D t + \phi_{cp}(J)] \quad (11)$$

$$Q(J) = (1+\epsilon)\sin(\omega_D t + \phi_{cp}(J) + \phi_E) \quad (12)$$

The gating times for the dumped integrators as controlled by the gating signals 104 and 106 may be the same as the interpulse period Tpp and the pulse width Tp as described supra. Accordingly, the I dumped integrator 90 may have an output $(DI_I)$ at the end of the J'th pulse which may be represented mathematically as follows:

$$DI_I(J) = \int_{t=JTpp}^{JTpp+Tp} \cos[\omega_D t + \phi_{cp}(J)] dt \quad (13)$$

$$DI_I(J) = \quad (14)$$

$$\frac{\sin[\omega_D JTpp + \omega_D Tp + \phi_{cp}(J)] - \sin[\omega_D JTpp + \phi_{cp}(J)]}{\omega_D}$$

Likewise, the Q dumped integrator 92 may have an output at the end of the J'th pulse which may be represented mathematically as follows:

$$DI_Q(J) = \int_{t=JTpp}^{JTpp+Tp} (1+\epsilon)\sin[\omega_D t + \phi_{cp}(J) + \phi_E] dt \quad (15)$$

$$DI_Q(J) = \frac{(1+\epsilon)}{-\omega_D}[\cos(\omega_D JTpp + \omega_D Tp + \phi_{cp}(J) + \phi_E) - \cos(\omega_D JTpp + \phi_{cp}(J) + \phi_E)] \quad (16)$$

The terms of the equations (14) and (16) contain the main beam clutter and its image, all of which must be positioned in the doppler frequency spectrum within the DC filter or "notch" filter of the FET 102. This may happen when the terms of the equations (14) and (16) are independent of J, i.e., they are of the same value for each pulse.

This occurs when:

$$\phi_{cp}(J) = -\omega_D JTpp + \phi_{cpo} \quad (17)$$

where $\phi_{cpo}$ is some constant phase. $\omega_D JTpp$ is simply the phase of the main beam clutter doppler bandwidth at the start of each pulse.

By substituting equation (17) into equations (14) and (16) the outputs of the dumped integrators 90 and 92 may be mathematically represented by the following equations:

$$DI_I(J) = \frac{\sin(\omega_D Tp + \phi_{cpo}) - \sin(\phi_{cpo})}{\omega_D} \quad (18)$$

$$DI_Q(J) = \frac{(1+\epsilon)}{\omega_D}[\cos(\phi_{cpo} + \omega_D Tp + \phi_E) - \cos(\phi_{cpo} + \phi_E)] \quad (19)$$

Since the above equations (18) and (19) are now independent of the pulse number J, they are therefore within the FFT notch filter or positioned substantially about the zero doppler frequency and may be removed by the notch filter of the FFT 102, as desired.

We claim:
1. An electronically agile, pulse-doppler coherent, multi-beam radar disposed on-board an aircraft which includes a means for measuring the velocity of the aircraft in flight, said radar operative to switchedly transmit a plurality of beams directionally separate by time sharing the illuminating power thereof, each beam including at least one transmission of a plurality of R.F. pulses constituting a radar look, said radar also operative to receive echo R.F. pulses of said look from each transmitted beam interspersed in time with echo R.F. pulses of the looks of the other transmitted beams of said plurality, said radar having an interpulse period divided into transmissionable time slots, each time slot corresponding to a potential transmission time for a pulse of a different beam look, said radar comprising:
means for deriving in a time-shared manner a relative phase characteristic for each of the plurality of

R.F. pulsed beams in accordance with both the direction of the corresponding beam transmission and said measured aircraft velocity associated therewith, said deriving means operative to perform said derivations for all said aforementioned beams once each transmissionable time slot of said interpulse period;

means for storing said derived relative phase characteristics corresponding to the time slot for which they are derived;

means for accessing each stored relative phase characteristic once each interpulse period corresponding to the time slot associated therewith;

means governed by said accessed relative phase characteristic to effect substantially a desired pulse-to-pulse phase relationship corresponding to the R.F. pulsed beam associated therewith.

2. The airborne radar in accordance with claim 1 wherein the effecting means comprises a phase shifter disposed in the transmission portion of the radar and updated with the accessed relative phase characteristics corresponding to the R.F. pulsed beam being transmitted once each interpulse period to effect the desired pulse-to-pulse phase relationship thereof.

3. The airborne radar in accordance with claim 1 wherein the effecting means comprises a phase shifter disposed in the reception portion of the radar and updated with the accessed relative phase characteristic corresponding to the R.F. pulsed beam being received once each interpulse period to effect the desired pulse-to-pulse phase relationship thereof.

* * * * *